Figure 1:
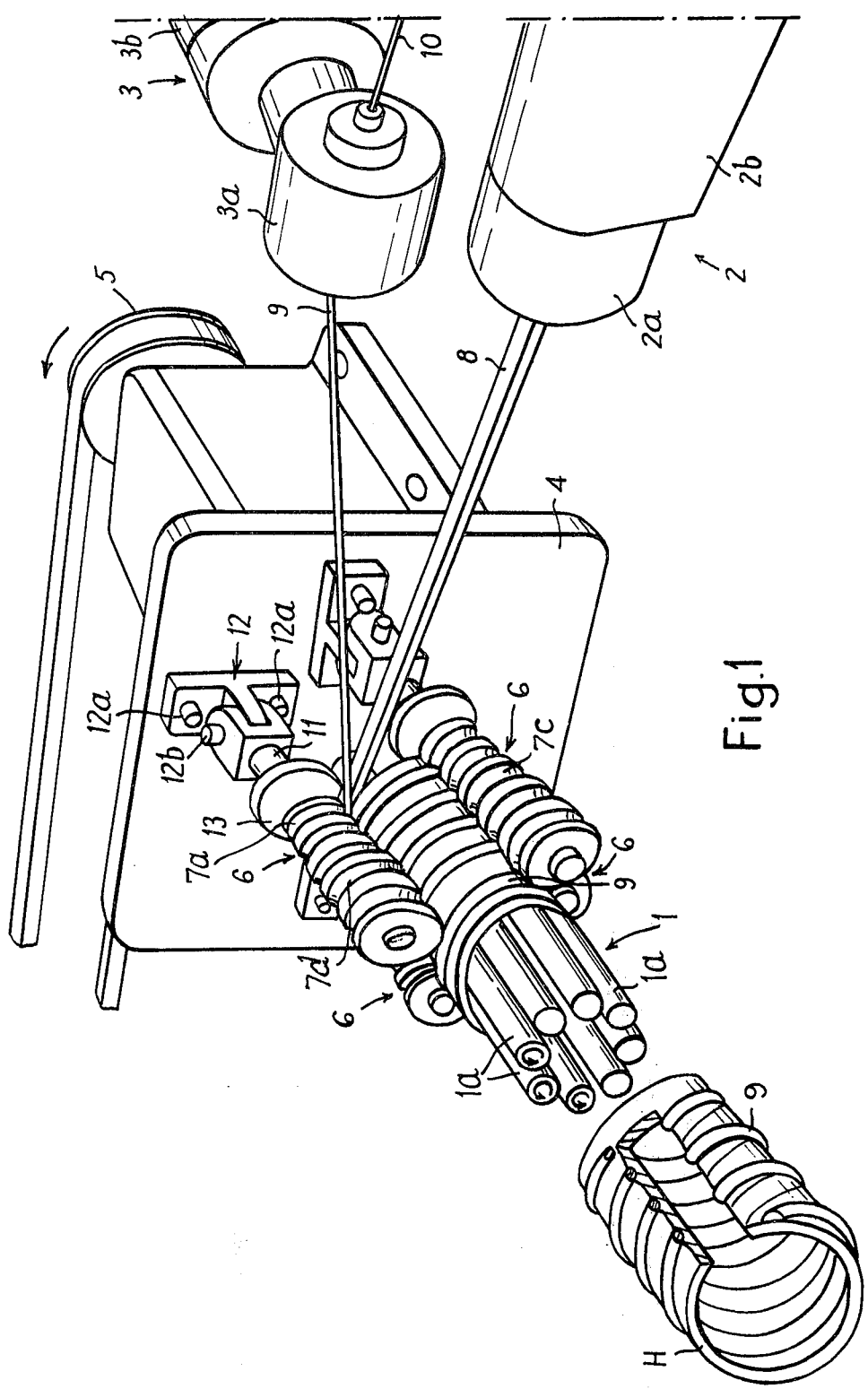

United States Patent [19]
Stent et al.

[11] 3,938,929
[45] Feb. 17, 1976

[54] FLEXIBLE PLASTICS HOSE MAKING APPARATUS

[75] Inventors: Vernon Dennis Stent; Derek Cecil Wright, both of Woking, England

[73] Assignee: Creators Limited, England

[22] Filed: Dec. 12, 1974

[21] Appl. No.: 532,227

Related U.S. Application Data

[62] Division of Ser. No. 355,593, April 30, 1973, Pat. No. 3,890,181.

[30] Foreign Application Priority Data

Nov. 27, 1972 United Kingdom............... 54636/72

[52] U.S. Cl. ............... 425/501; 425/112; 425/505; 425/517; 425/224; 425/363; 425/367; 264/174
[51] Int. Cl.² ......................................... B29C 27/28
[58] Field of Search .......... 264/174, 281, 285, 339, 264/136, 137, 234; 425/501, 505, 518, 112, 224, 363, 335, 367, 517

[56] References Cited
UNITED STATES PATENTS

| | | |
|---|---|---|
| 3,207,827 | 9/1965 | Kuehule............................ 264/174 |
| 3,240,645 | 3/1966 | Friedwald et al................ 425/112 X |
| 3,273,199 | 9/1966 | Kleinewefers.................... 425/367 X |
| 3,454,695 | 7/1969 | Holmgren ........................ 264/281 X |
| 3,526,692 | 9/1970 | Onaka.............................. 425/112 X |

Primary Examiner—Robert L. Spicer, Jr.
Attorney, Agent, or Firm—Larson, Taylor and Hinds

[57] ABSTRACT

A method of, and apparatus for manufacturing a flexible plastics hose the method comprising extruding a strip of a first plastics material and a reinforcing element of a second plastics material, winding said strip into a helix around a driven mandrel and bonding adjacent turns together by pressure applied between the mandrel and roller means external thereof to form a tubular wall of said plastics material and simultaneously winding said reinforcing element around the helix of said first plastics material in spaced apart helical turns and pressing it into the first plastics material by said roller means so as to partially embed said reinforcing element into said tubular wall.

4 Claims, 7 Drawing Figures

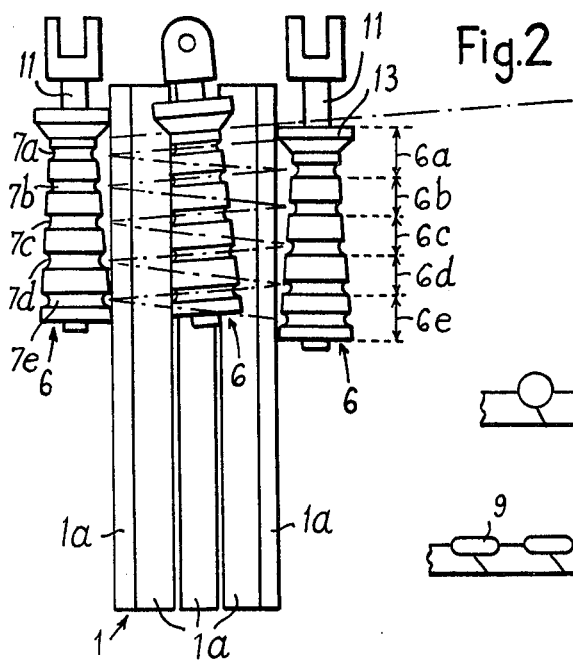

FLEXIBLE PLASTICS HOSE MAKING APPARATUS

This is a division, of application Ser. No. 355,593 filed Apr. 30, 1973, now U.S. Pat. No. 3,890,181.

This invention relates to a flexible plastics hose of which the tube wall comprises a helically-wound strip of plastics material the turns of which are bonded together and surrounded by spaced turns of a helically-wound reinforcing element which is at least partially embedded in the material of the tube wall (hereinafter called "a flexible plastics hose of the kind referred to"), and more particularly to a method of and apparatus for manufacturing a flexible plastics hose of the kind referred to.

From one aspect the invention consists in a method of manufacturing a reinforced plastics hose of the kind referred to, comprising extruding a strip of a first plastics material, simultaneously extruding a reinforcing element of a plastics material which (a) is more rigid and/or has a higher mechanical strength than said first plastics material and/or (b) has a core of a material which imparts to said reinforcing element more rigidity and/or a higher mechanical strength than said first plastics material, winding said strip into a helix around a driving mandrel while the plastics material is still in a plastic condition and bonding adjacent turns together by pressure applied between said mandrel and roller means external thereof to form a tubular wall of said plastics material, and simultaneously winding said reinforcing element around said helix of said first plastics material in spaced helical turns having the same pitch angle as said helix of first plastics material while guiding the reinforcing element into said spaced helical turns and pressing it into the first plastics material by said roller means so as to partially embed said reinforcing element into said tubular wall and to feed the tubular wall with the reinforcing element partially embedded therein axially of the mandrel.

By selecting for the hose wall and the reinforcing element plastics materials which are compatible, the helical reinforcing element may be fused or bonded to the tubular wall of the hose by the pressure exerted by the roller means.

The reinforcing element is preferably wound so as to overlie the joins between adjacent turns of the strip of the first plastics material.

The reinforcing element may be made by extruding plastics material around a core, such as a metal wire or a textile cord to provide the reinforcement or additional reinforcement.

The guiding of the reinforcing element into its spaced helical turns is conveniently effected by annular guide grooves in the roller means, spaced apart corresponding to the pitch of said turns, and of a depth such that the base of a groove presses the reinforcing element to the desired partial extent into the wall layer of the first plastics material. The groove side walls act like a nut on the turns of the partially projecting reinforcing element moving therethrough to advance the formed hose towards and off the end of the mandrel. A plurality of roller means may be disposed around the mandrel which, in order to minimise frictional resistance against the advance of the formed hose along the mandrel, preferably comprises a plurality of driven rollers disposed on a circle around the centre axis of the mandrel, thereby providing gaps between the peripheral zones of the mandrel rollers against which the inner surface of the formed hose is supported.

The roller guide grooves need only extend along the mandrel for a distance such that the engaged turns of progressively hardening plastics materials exert a total reaction sufficient to ensure the forward feeding of the formed hose. Thereafter, if desired, the reinforcing element can be pressed further in to the plastics material of the tube wall, or a further extruded strip of plastics material may be wound around the formed hose, and preferably bonded thereto by pressure, so that the reinforcing element becomes completely embedded in the wall of the finished hose.

From another aspect, the invention consists in apparatus for manufacturing a flexible plastics hose of the kind referred to, comprising a mandrel around which the extruded strip of plastics material and the reinforcing element are to be wound, said mandrel comprising a plurality of mandrel rollers which are circumferentially equi-spaced on a circle around and extend substantially parallel to the centre axis of the mandrel, means for driving said mandrel rollers in the same direction and at the same speed, and a plurality of roller assemblies disposed at circumferentially spaced positions around said mandrel for pressing the plastics materials against the mandrel to bond the turns of the strip of plastics material together and to partially embed the reinforcing element in said plastics material, each said roller assembly comprising a plurality of roller sections rotatable about a common axis, each independently of other roller sections of a roller assembly, each roller assembly being disposed opposite a mandrel roller with its axis intersecting a radial line from the center axis of the mandrel through the axis of said opposing mandrel roller and inclined to said center axis of the mandrel, tangentially of the mandrel, at an angle equal to the pitch angle of the helical turns of the reinforcing element of the hose to be made, each roller section having a portion formed with a guide groove for receiving the reinforcing element with adjacent guide grooves of an assembly being spaced apart by a distance corresponding to the pitch of the helical turns of the reinforcing element and the diameters of at least the grooved portions of the roller sections increasing in the direction of hose formation, and successive roller assemblies in the direction of winding of the plastics materials being so positioned axially of the mandrel that the guide grooves thereof locate with the turns of the reinforcing element around the hose being made.

Preferably the first roller section of each roller assembly has a portion of such diameter that it touches or substantially touches the surface of the opposing mandrel roller, and thereby serves to guide the strip of plastics material forming the tube wall into the desired helical path and assists in feeding the formed hose along the mandrel.

The invention also consists in reinforced flexible plastics hoses made by the said method or apparatus.

In order that the invention may be more readily understood, reference will now be made to the accompanying drawings, in which:

FIG. 1 is a perspective view of one embodiment of an apparatus according to the invention, FIG. 2 is a plan view of part of the apparatus of FIG. 1, and FIGS. 3 to 7 are fragmentary sectional views of various different embodiments of hose according to the invention.

Referring to FIGS. 1 and 2, the apparatus comprises a mandrel 1 around which are helically wound plastics extrudates from two extrusion devices 2 and 3 arranged alongside the mandrel. Each extrusion device comprises an extrusion die head 2a or 3a to which plastics material is fed from extruders 2b or 3b respectively. A strip 8 of a first thermo-plastics material, such as a soft grade of polyvinylchloride, is extruded by the device 2 and fed to the mandrel 1 and at an angle to the centre axis of the mandrel corresponding to the pitch angle at which the strip 8 has to be wound around the mandrel along a helical path so that adjacent turns of the helically wound strip 8 will touch one another or substantially so. A second plastics material is extruded by the device 3 to form a reinforcing element 9, the second plastics material, for example, rigid polyvinylchloride, being more rigid and/or having a higher mechanical strength than the first plastics material. The extruded reinforcing element 9 is fed to the mandrel 1 at the same pitch angle as the strip 8. As shown in FIG. 1 the extrusion nozzle of the device 3 is arranged above the extrusion nozzle of the device 2 so that the element 9 will be wound on the mandrel over the strip 8.

The mandrel 1 is mounted horizontally on a support 4 and comprises a plurality of mandrel rollers 1a which are circumferentially equi-spaced on a circle around and extend parallel to the center axis of the mandrel. The mandrel rollers 1a are driven at the same speed and in the same direction, as indicated by the arrows, from the belt driven pulley 5 through a suitable arrangement of gears, not shown.

A plurality of guiding and pressing roller assemblies 6, four in the embodiment shown, are disposed at circumferentially spaced positions, preferably circumferentially equi-spaced positions, around the mandrel for guiding the reinforcing element 9 and the strip 8 so that they will be wound around the mandrel at the desired helical pitch angle and for pressing the plastics materials thereof against the mandrel to bond the turns of the strip 8 together and to partially embed the reinforcing element 9 into the plastics material of the strip 8. Each roller assembly comprises a plurality of roller-sections 6a, 6b, etc. which are rotatable, each section independently of the others, on a common shaft 11. The shaft 11 of each assembly is carried from the support 4 by an adjustable bracket 12 which enables not only the radial spacing and circumferential location of the associated shaft 11 to be adjusted relative to the center axis of the mandrel 1 by the bolts 12a securing the bracket 12 to the support 4, but also the inclination of the axis of the shaft 11 relative to the central axis of the mandrel, tangentially of the mandrel, to be adjusted by turning the part of the bracket to which the shaft 11 is attached about a bolt 12b which can be tightened to lock the two parts of the bracket together in the adjusted position. Each roller assembly is disposed opposite a mandrel roller 1a and adjusted so that the axis of its shaft 11 intersects a radial line from the center axis of the mandrel through the axis of the said opposing mandrel roller and is inclined to the center axis of the mandrel at an angle equal to the pitch angle of the helical turns of the reinforcing element of the hose to be made.

Each roller section 6a, 6b, 6c, etc., has a portion formed with a guiding groove 7a, 7b, 7c, etc., for receiving the reinforcing element, adjacent guiding grooves of a roller assembly being spaced apart by a distance corresponding to the pitch of the helical turns of the reinforcing element. Since the shaft 11 is inclined to the axis of the mandrel, its spacing from the surface of the opposing mandrel roller 1a increases in the direction of hose formation, and to compensate for this and enable the successive guiding grooves to maintain guiding contact with successive turns of the reinforcing element, the grooved portions of the successive roller sections of a roller assembly increase in diameter in the direction of hose formation. Preferably also the diameters of the troughs of the guiding grooves, and also the portions of the roller sections between adjacent grooves, similarly increase in diameter in the direction of hose formation to maintain pressure contact on the reinforcing element 9 and the material of the strip 8 throughout the length of each roller assembly. Theoretically, uniform contact pressure requires the increment of the diameters to follow a curved line depending on the inclination of the roller assembly and the diameter of the opposing mandrel roller 1a but in practice it has been found satisfactory if the diameters increase in a frusto-conical or simple taper form as illustrated in FIG. 2.

Successive roller assemblies in the direction of winding of the plastics materials are so positioned axially of the mandrel that the guide grooves thereof locate with the turns of the reinforcing element of the hose being made. Thus, in the case of the embodiment illustrated in FIGS. 1 and 2, having four roller assemblies equally spaced around the mandrel, the guiding grooves of corresponding roller sections of successive roller assemblies in the direction of winding are displaced axially of the mandrel by a distance equal to one quarter of the pitch of the turns of the reinforcing element.

As shown, the first roller section 6a of each roller assembly has a buttress portion 13 of such diameter that it touches or substantially touches the surface of the opposing mandrel roller. These buttress portions 13 serve to guide the first turn of the strip 8 into the desired helical path, the pressure exerted by them on the side of the strip 8 urging it towards the previously wound turn and assisting in feeding the formed hose along the mandrel. In the embodiment shown, the surface of each buttress portion 13 which engages with the side of the strip 8 is of frusto-conical shape to substantially correspond with the slope of the side surface of the strip 8 which it engages, it being preferred that the strip 8 be formed with a rhombic cross-section, as shown in FIG. 3, as this formation assists in the bonding of adjacent turns of the strip 8 by the applied radial pressure.

As the extended strip 8 and the extruded reinforcing element 9 are in the thermoplastic condition as they are wound around the mandrel, the roller sections of the roller assemblies 6 press them together to partially embed the reinforcing element into the tube wall formed by the strip 8 and also to bond adjacent turns of the strip 8 together. Conveniently, the guiding grooves are arranged to guide the reinforcing element 9 so that it overlies the joins between adjacent turns of the strip 8 as shown in FIG. 3. This has the advantage that the pressure exerted by the guiding grooves to partially embed the reinforcing element in the material of the strip 8 ensures adequate pressure between adjacent turns of the strip 8 to achieve a good bond. The portions of the roller sections between the grooves apply such pressure on the portions of the strip 8 between the turns of the reinforcing element as is necessary to obtain a good bond between its turns. Preferably, the plastics materials of the strip 8 and reinforcing element are compatible so that as they are wound and pressed together in the thermoplastic condition, they will also be bonded together.

As the plastics materials are wound around the mandrel, the guiding grooves act as a kind of nut on the partially projecting helical turns of the reinforcing element, assisted by the force exerted by the portions 13 of the roller sections 6a on the side of the first turn of the strip 8, to advance the hose along the mandrel as it is formed, and finally off the end of the mandrel. The finished hose H discharged from the end of the mandrel, after plugging its open end, may be floated, while still rotating, on water contained in a long trough, whereby the plastics materials are also water cooled.

The reinforcing element, instead of or in addition to being made of a plastics material which is more rigid and/or of greater mechanical strength than the plastics material of the strip 8, may be provided with a core of metal wire, a textile or nylon cord, or of other material which provides the desired reinforcement. The core may be incorporated by providing the extrusion device 3 with a cross-head die 3a through which the core 10 is introduced as shown in FIG. 1. A core of metal wire, such as bare stranded wire or other conducting material when earthed, also serve to avoid a build up of static electricity along the hose and can also be used as an earthing wire between end couplings of lengths of hose for discharging static electricity which may be generated at a hose nozzle.

An earthing wire may alternatively be provided as an insert in the strip 8, and may be introduced therein by providing the extrusion device 2 with a cross-head extrusion head.

If desired, the strip 8 can comprise two or more layers of plastics materials, for achieving any particular desired hose characteristics. For example, it may have an inner layer of a plastics material possessing advantageous properties, e.g., oil resistance, for the use to which the hose is to be put. For example, the inner layer, which forms the inner wall of the hose, may be of polyurethane. The outer layer may be PVC.

Axial sections through the walls of examples of hose produced according to the invention are illustrated in FIGS. 3 to 7. Each hose comprises a tube wall constituted by the helically wound strip 8 of the first plastics material the turns of which are bonded together, having the helically wound reinforcing element 9 around the outside thereof and at least partially embedded therein, the adjacent turns of of the reinforcing element 9 being axially spaced apart. The reinforcing element which possesses greater rigidity or a higher mechanical strength than the wall material of the hose which it surrounds, serves to reinforce the hose. Preferably, as shown, the reinforcing element 9 overlies the joins between adjacent turns of the strip 8 constituting the tube wall. In the embodiments illustrated in FIGS. 3 and 5 the reinforcing element has a circular cross-section and in that illustrated in FIG. 4 it has a wider, flatter cross-section. In FIG. 6 the element 9 has an eccentrically disposed core in the form of bare strand wire surrounded by the second plastics material. In the hose of FIG. 7, two reinforcing helices are wound around the softer plastics material, one of the reinforcing helices 9a being an extruded filament of the more rigid or harder plastics material and the other 9b comprising a strand wire covered with a conducting PVC (e.g., a PVC containing conductive particles). Where two different reinforcing elements are wound around the tube wall an extra extrusion nozzle is provided for the additional reinforcing element and the form of the guiding and pressing rollers must be appropriately modified.

While particular embodiments have been described, it will be understood that various modifications may be made without departing from the scope of the invention. Thus the guiding grooves 7a, 7b, etc., may progressively decrease in depth, so that the reinforcing helix becomes progressively further embedded in the tube wall material as the hose formation proceeds. The free ends of the roller assemblies may carry plain roller sections for achieving further embedment or flattening of the reinforcing element.

However, it must be borne in mind that the advance of the hose along the mandrel is produced by the total reaction of the turns of the projecting portions of the reinforcing element (the plastics material of which, as does the plastics material of the strip 8, progressively cools and hardens somewhat as it advances along the mandrel, which cooling can be assisted by impinging cold air thereon) on the guiding grooves, assisted by the axial forces exerted by the buttress portions 13 on the strip 8, so that care must be taken to provide sufficient axial reaction to advance the hose being made without undesirable distortion. For making hoses of particularly long length, or of softer materials, it may be necessary to provide two or more sets of roller assemblies, arranged in tandem along the mandrel, in order to provide sufficient axial reaction to advance the hose along the mandrel. In this regard, the construction of the mandrel of a plurality of mandrel rollers with spaces therebetween where the tube wall is unsupported, is important in reducing the resistance to axial advance along the mandrel.

According to another modification, the first roller section 6a, or at least the buttress portion thereof, of each roller assembly may be positively driven. The drives may be effected through suitable gearing from the pulley 5, and in order to enable the inclination of the shafts 11 to be adjusted to suit the hose to be made, they may be connected to the driving means by universal joints.

Further, instead of forming the guiding grooves at the ends of a roller section as shown in the illustrated embodiment they may be provided at an intermediate position along a roller section.

We claim:

1. An apparatus for manufacturing a flexible plastics hose wherein a strip of a first plastics material is extruded, a reinforcing element of a second plastics material is simultaneously extruded, said strip is wound into a helix around a driven mandrel while the plastics material is still in a plastic condition and adjacent turns are bonded together by pressure applied between said mandrel and roller means external thereto to form a tubular wall of said plastics material, said reinforcing element being simultaneously wound around said helix of said first plastics material in spaced helical turns having the same pitch angle as said helix of first plastics material while the reinforcing element is guided into said spaced helical turns and is pressed into the first plastics material by said roller means so as to partially embed said reinforcing element into said tubular wall and to feed the tubular wall with the reinforcing element partially embedded therein axially of the mandrel, said apparatus comprising a mandrel around which the extruded strip of plastic material and the reinforcing element are to be wound, said mandrel comprising a plurality of mandrel rollers which are circumferentially equi-spaced on a circle around and extend substantially parallel to the center axis of the mandrel, means for driving said mandrel rollers in the same direction and at the same speed, and a plurality of roller assemblies disposed at circumferentially spaced positions around said mandrel for pressing the plastics materials against the mandrel to bond the turns of the strip of plastics material together and to partially embed the reinforcing element in said plastics material, each said roller assembly comprising a plurality of roller sections rotatable about a common axis, each independently of other roller sections of a roller assembly, each roller assembly being disposed opposite a mandrel roller with its axis intersecting a radial line from the center axis of the mandrel through the axis of said opposing mandrel roller and inclined to said center axis of the mandrel, tangentially of the mandrel, at an angle equal to the pitch angle of the helical turns of the reinforcing element of the hose to be made, each roller section having a portion formed with a guide groove for receiving the reinforcing element with adjacent guide grooves of an assembly being spaced apart by a distance corresponding to the pitch of the helical turns of the reinforcing element and the diameters of at least the grooved portions of the roller sections increasing in the direction of hose formation, and successive roller assemblies in the direction of winding of the plastics materials being so positioned axially of the mandrel that the guide grooves thereof locate with the turns of the reinforcing element around the hose being made.

2. Apparatus as claimed in claim 1, wherein the first roller section of each roller assembly has a buttress portion adapted to be engaged by the side wall of the first turn of the strip.

3. Apparatus as claimed in claim 1, wherein the roller sections of a roller assembly are mounted on a common shaft, means being provided for adjusting the inclination of said shaft to the center axis of the mandrel.

4. Apparatus as claimed in claim 1, in combination with two extrusion devices through which the strip of plastics material and the reinforcing element are adapted to be extruded, said extrusion devices being so disposed in relation to the mandrel that both extrudates will be fed to the mandrel at an inclination to the center axis of the mandrel substantially equal to the pitch angle at which the strip and reinforcing element are to be wound around the mandrel to make the hose to be made and with the reinforcing element outside the strip.

* * * * *